US006968980B2

(12) United States Patent
Giblin et al.

(10) Patent No.: US 6,968,980 B2
(45) Date of Patent: Nov. 29, 2005

(54) POUR SPOUT FITMENT AND CONTAINER (75) Inventors: Edward John Giblin, Hopatcong, NJ (US); Philip Andrew Tarrant, Hoboken, NJ (US); Alyson Leigh Garcia, Guilderland, NY (US); Jaimee Terese Simone, Liverpool, NY (US)

(73) Assignee: Unilever Home & Personal Care USA, a division of Conopco, Inc., Greenwich, CT (US)

( * ) Notice: Subject to any disclaimer, the term of this patent is extended or adjusted under 35 U.S.C. 154(b) by 43 days.

(21) Appl. No.: 10/747,995

(22) Filed: Dec. 30, 2003

(65) Prior Publication Data

US 2005/0139609 A1   Jun. 30, 2005

(51) Int. Cl.[7] .................................................. B67D 1/16
(52) U.S. Cl. ........................ 222/109; 222/571; 215/41
(58) Field of Search ................ 222/109, 111, 566–572, 222/481–482, 108, 575, 424, 424.5, 318; 215/41, 392

(56) References Cited

U.S. PATENT DOCUMENTS

| 328,533 | A | 10/1885 | Taylor et al. | |
|---|---|---|---|---|
| 1,014,427 | A | 1/1912 | Warren et al. | |
| 1,351,496 | A | 8/1920 | Spooner | |
| 1,415,908 | A | 5/1922 | Tofling | |
| 1,617,842 | A | 2/1927 | Grunberg | |
| 2,019,402 | A | 10/1935 | Duffy | 215/43 |
| 2,341,102 | A | 2/1944 | Kanzaki | 215/31 |
| 2,549,225 | A | 4/1951 | Moy | |
| 3,017,047 | A | 1/1962 | Payson et al. | 215/13 |
| 3,391,838 | A | 7/1968 | Gundel | 222/571 |
| 3,895,743 | A | 7/1975 | Christian | 222/143 |
| 3,935,968 | A | 2/1976 | Rausing | 222/479 |
| 4,111,340 | A | 9/1978 | Greenhow et al. | 222/527 |
| 4,280,434 | A | 7/1981 | Beckerer, Jr. | 114/174 |
| 4,550,862 | A | 11/1985 | Barker et al. | 222/109 |
| 4,640,855 | A | 2/1987 | St. Clair | 428/36 |
| 4,671,421 | A | 6/1987 | Reiber et al. | 215/22 |
| 4,696,416 | A | 9/1987 | Muckenfuhs et al. | 222/109 |
| 4,706,829 | A | * 11/1987 | Li | 215/354 |
| 4,711,365 | A | 12/1987 | Fomby | 220/288 |
| 4,890,768 | A | 1/1990 | Robinson | 222/109 |
| 4,917,268 | A | * 4/1990 | Campbell et al. | 222/109 |
| 4,917,269 | A | 4/1990 | Fuchs et al. | 222/109 |
| 4,929,410 | A | 5/1990 | Meyer et al. | 264/533 |
| 4,981,239 | A | 1/1991 | Cappel et al. | 222/109 |
| 4,989,757 | A | 2/1991 | Krall | 222/111 |
| 5,020,692 | A | 6/1991 | Darr | 222/109 |
| 5,058,772 | A | * 10/1991 | Moore et al. | 222/109 |
| 5,060,827 | A | 10/1991 | Segati | 222/109 |
| 5,108,009 | A | * 4/1992 | Davidson et al. | 222/109 |
| 5,114,659 | A | 5/1992 | Krall | 264/539 |
| 5,131,566 | A | 7/1992 | Bavegems | 222/80 |
| 5,207,341 | A | 5/1993 | Yeager | 215/334 |
| 5,207,356 | A | * 5/1993 | Krall | 222/109 |
| 5,303,837 | A | 4/1994 | Adams et al. | 220/254 |
| 5,429,789 | A | 7/1995 | Krall | 264/533 |

(Continued)

Primary Examiner—Frederick C. Nicolas
(74) Attorney, Agent, or Firm—Milton L. Honig (57) ABSTRACT

The present invention is directed to a pour spout fitment that has an enlarged spout opening thereby making it less susceptible to double pouring and advantageous for dispensing new flowable product forms such as gels. The pour spout opening is large relative to the bottle opening which is equated with the fitment's circumscribing wall. Accordingly, the pour spout fitment is less susceptible to double pouring and may also be useful for pouring more viscous product forms such as gels.

16 Claims, 4 Drawing Sheets

U.S. PATENT DOCUMENTS

| | | | |
|---|---|---|---|
| 5,431,306 A | 7/1995 | Reid | 222/111 |
| 5,435,467 A * | 7/1995 | Ekkert et al. | 222/109 |
| 5,462,202 A * | 10/1995 | Haffner et al. | 222/109 |
| 5,498,149 A | 3/1996 | Bengtsson | 425/387.1 |
| 5,564,603 A | 10/1996 | Malmberg | 222/153.06 |
| 5,566,862 A * | 10/1996 | Haffner et al. | 222/111 |
| 5,597,090 A | 1/1997 | Leahy | 222/1 |
| 5,598,877 A | 2/1997 | Reidel | 141/346 |
| 5,603,787 A | 2/1997 | Reid | 156/73.1 |
| 5,855,299 A * | 1/1999 | Arnold et al. | 222/109 |
| 6,375,041 B1 * | 4/2002 | Klima et al. | 222/129 |
| 6,398,076 B1 * | 6/2002 | Giblin et al. | 222/109 |
| 2002/0011498 A1 | 1/2002 | Giblin et al. | 222/109 |

\* cited by examiner

POUR SPOUT FITMENT AND CONTAINER

FIELD OF THE INVENTION

The present invention is directed to a pour spout fitment. More particularly, the invention is directed to a pour spout fitment having an enlarged spout thereby making it less susceptible to double pouring and advantageous for dispensing new flowable product forms such as gels.

BACKGROUND OF THE INVENTION

Heavy duty liquid detergent products have grown in popularity over recent years. The sale of such products in specialized dispensing containers, usually including a combined measuring cup/closure, and a bottle with a drainback fitment/spout has enhanced the consumers experience in the use of such products thus helping to increase their popularity.

While drainback containers have enhanced the convenience of the use of heavy duty liquid detergents and other products, still some problems exist. Many of the containers, especially those with drainback fitments, are susceptible to double pouring. Double pouring is when two streams of product are dispensed by a single pouring fitment. One stream is poured through the pouring spout as is intended. Another stream is poured through a drainback reservoir. Double pouring especially occurs during the initial dispensing of a full bottle. The problem which this presents is that one of the streams (typically the stream coming from the drainback reservoir) may not pour into the area that the user wants it to, such as into a measuring cup or into the wash basin of a washing machine. This results in the product being spilled causing an unpleasant user experience.

While consumers have grown increasingly to prefer laundry detergents in the form of liquids, new laundry detergents in the form of gels have also been developed. Thus, the need is as great as ever for a convenient container for neatly and efficiently dispensing products such as heavy duty liquid as well as other flowable forms such as gels.

An object of the present invention is to provide a pour spout fitment that is less susceptible to double pouring, thereby making the user's experience more pleasant.

Another object of the present invention is to provide a pour spout fitment that may be used with new product forms such as gels.

Other objects of the present invention will become apparent to those skilled in the art by reference to the specification.

ADDITIONAL INFORMATION

Numerous dispensers have been disclosed in the patent literature.

Bengtsson, U.S. Pat. No. 5,498,149 discloses a device for thermoforming a pouring spout.

Greehow et al., U.S. Pat. No. 4,111,340 discloses a pouring spout for threaded neck containers. At least portions may be thermoformed.

Malmberg, U.S. Pat. No. 5,564,603 discloses a thermoformed pour spout.

Christian, U.S. Pat. No. 3,895,743 discloses a lid including a pour spout. Preferably, the closures are vacuum thermoformed.

Reid, U.S. Pat. No. 5,603,787 discloses a plastic container for pourable liquids such as detergents which has a drainback feature. The container is formed in two pieces, a container body and a separately formed pour spout which is assembled to the container finish preferably by ultrasonic welding. A lip of the pour spout component is pressed and welded down onto an annular top surface of the container finish. The pour spout component includes internal threads which mate with external threads on the closure, which also serves as a measuring cup.

Reidel, U.S. Pat. No. 5,598,877 is directed to a liquid dispenser having a botcher with a holder.

Leahy, U.S. Pat. No. 5,597,090 is directed to an apparatus for pouring liquids which includes a cap having internal threads mated with external threads on the container finish, and a fitment which has a flange 39 which mates with the open end of the container at the neck.

Haffner et al., U.S. Pat. No. 5,566,862 is directed to a liquid dispensing fitment for use on a container. The container finish includes external threads which mate with internal threads on a closure. The fitment includes a peripheral flange adapted to engaged the upper surface of the neck.

Haffner et al., U.S. Pat. No. 5,462,202 discloses a liquid dispensing fitment for use on a container having a neck. The finish of the container includes external threads which mate with internal threads on a closure. The fitment includes a flange adapted to engage the upper surface. The fitment includes vertical ribs which are said to facilitate stacking of the fitments.

Ekkert et al., U.S. Pat. No. 5,435,467 discloses a pouring spout configured to permit orientation-specific stacking. A container is illustrated having an externally threaded finish mating with an internally threaded closure. A peripheral flange on the fitment fits atop the neck of the finish.

Reid, U.S. Pat. No. 5,431,306 discloses a fitment having internal threads and a flange which rests on the upper edge of the container finish.

Krall, U.S. Pat. No. 5,429,789 discloses a self-draining container. Located within an annular wall is a spout. A closure include a skirt which has external threads which engage the internal threads of the annular wall. Extending radially outwardly from the skirt of the closure above the threads is a ledge adapted to seat against the top of the annular wall to seal the container when the threads are fully engaged.

Adams et al., U.S. Pat. No. 5,303,837 discloses a tamper evident device which comprises a fitment attached around an aperture in a container and having a flange from which extends an internally threaded spout. The spout is closed by an initially integrally molded externally threaded plug.

Krall, U.S. Pat. No. 5,207,356 discloses a self draining container including an integral dispensing spout. An integral wall extends upwardly from the body and encircles the spout and an integral web joins the wail on the dispensing spout to form a drain channel. A cap having a depending skirt with external threads mates with an internal thread on the container wall. The cap also includes a radially outwardly extending sealing ring.

Meyer et al., U.S. Pat. No. 4,929,410 discloses a closure with external threads and a shoulder and, in FIG. 8, an internally threaded neck of a plastic bottle in which a pouring adapter insert has been mounted. It is said that the details of the pouring adapter and of the internal attachment means may be varied, but FIGS. 7 and 8 illustrate the pouring adapter insert as having a snap flange designed to fit within a groove of the internal attachment means.

Yeager, U.S. Pat. No. 5,207,341 discloses a container which includes a closure having a concentric inner skirt and outer skirt, the outer skirt covering and protecting the outer circumference area of the bottle neck thereby protecting it from the environment outside the bottle.

Bavegems, U.S. Pat. No. 5,131,566 is directed to a package for flowable products incorporating a refill facilitating pouring spout structure. Internal screw threads on the pouring spout structure mate with external screw threads on the package.

Krall, U.S. Pat. No. 5,114,659 discloses a self draining container. The container includes a body having a wall extending upwardly from a body opening. The wall surrounds a dispensing spout. A web joins the wall on the dispensing spout to form a drain channel. A closure has a depending skirt having external threads which mate with internal threads on the wall. The closure also includes an outwardly extending radial sealing ring.

Segati, U.S. Pat. No. 5,060,827 relates to a low profile closure which includes a coupling member which is mounted on a container dispensing opening. The coupling member includes a top peripheral edge which defines an outwardly projecting spout. The cap has external threads which mate with internal threads on the coupling member.

Darr, U.S. Pat. No. 5,020,692 discloses a container having a unitary plastic blow-molded bottle which has a dispensing spout projecting upwardly from a hollow body portion. In one embodiment, an annular insert surrounds the spout and has internal retainers which secure external retainers on the cap to provide sealing. The cap also includes a round sealing surface that faces downwardly in alignment with a round sealing surface on the annular insert.

Krall, U.S. Pat. No. 4,989,757 discloses a self draining container having a dispensing spout and a wall surrounding the dispensing spout. A web joins the wall on the dispensing spout to form a drain channel. A closure has a depending skirt with external threads which mate with internal threads on the container wall. The closure also includes a ledge adapted to seat against the top of the annular wall.

Cappel et al., U.S. Pat. No. 4,981,239 is directed to a container for liquids which comprises a closure having external threads which mate with internal attachment means on an annular skirt. The skirt includes means for attachment to the container. The lower end of a fluid retaining means, which includes a spout, is fused to the container in a liquid tight relation.

Fuchs et al., U.S. Pat. No. 4,917,269 discloses a container having a neck with an upwardly extending integral dispensing spout, an integral web extending radially outwardly from the lower end of the dispensing spout and a cylindrical wall spaced radially outwardly of the spout and encircling the spout. The cylindrical wall has an internal thread and a closure has external threads which mate with the internal threads. The closure includes an annular flexible sealing ring above the threads which engages an inner surface of the cylindrical wall and flexes upwardly to provide a seal. A sealing ring above the annular flexible sealing ring extends radially outwardly on the closure and engages the top of the cylindrical wall when the closure is threaded onto the container.

Robinson, U.S. Pat. No. 4,890,768 is directed to a self draining container having a body and an upper integral pouring spout. A ring member is attached to and surrounds the pouring spout. The ring member includes internal threads which mate with threads on a closure.

Fomby, U.S. Pat. No. 4,711,365 discloses a container having internal threads which mate with external threads on a closure. As the closure member is twisted to engage the threads of the container, an annular face of the container rim engages a complementarily configured annular recess in the closure member.

Muckenfuhs et al., U.S. Pat. No. 4,696,416 discloses a container having a finish with external threads, a transition collar including a pour spout having internal threads for mating with the external threads of the bottle finish, the transition collar also including internal threads for mating with external threads of a closure. The closure also includes a shoulder projecting outwardly and providing a sealing surface adapted to contact a sealing ring on an upper surface of the circumscribing wall of the collar.

Reiber et al., U.S. Pat. No. 4,671,421 discloses a plastic container having an insert positioned in the finish. The insert has internal threads for receiving a closure which has external threads. The closure also includes a peripheral flange sealingly engaging the free end of the finish. The insert includes a pour spout. The insert may be placed in position while the finish is hot and when the finish is cooled it shrinks into sealing engagement with the insert. Alternatively, the insert may be spin welded into sealing engagement with the finish. Another option is the use of an adhesive. The spout may be supported by a groove of the insert. In another embodiment the insert has a spout integrally formed within.

St Clair, U.S. Pat. No. 4,640,855 discloses a plastic container with an integral spout. An inner wall of the container neck includes internal threads. The internal threads can receive a threaded closure for closing the package.

Barker et al., U.S. Pat. No. 4,550,862 discloses a package similar to that disclosed in the Muchenfuhs patent mentioned above.

Beckerer, Jr., U.S. Pat. No. 4,280,434 discloses a threaded access cover plate construction for boat decks.

Rausing, U.S. Pat. No. 3,935,968 discloses a container having a threaded neck closed by an externally threaded plug.

Gundel, U.S. Pat. No. 3,391,838 discloses a container said to have anti drip means. A closure has external threads mating with internal threads on the container. The closure also includes an upper umbrella-like concave wall provided to engage and seal the upper edge of the bottle including the pouring spout.

Payson et al., U.S. Pat. No. 3,017,047 discloses a combination vacuum bottle and closure means.

Moy, U.S. Pat. No. 2,549,225 is directed to a non-drip dispensing bottle stopper having external threads mating with internal threads on a bottle.

Kanzaki, U.S. Pat. No. 2,341,102 discloses a bottle having a cap with external threads which cooperate with internal threads on the bottle.

Duffy, U.S. Pat. No. 2,019,402 discloses a bottle having internal and external threads mating with the internal and external threads of a cap.

Grunberg, U.S. Pat. No. 1,617,842 discloses a perfume bottle having internal threads mating with the external threads of a cap.

Tofting, U.S. Pat. No. 1,415,908 is directed to a jar having internal threads mating with external threads on a closure.

Spooner, U.S. Pat. No. 1,351,496 is directed to jar closures having threads mating with those on jars.

Warren, U.S. Pat. No. 1,014,427 is directed to a bottle stopper which has external threads mating with internal threads on the bottle.

Taylor, U.S. Pat. No. 328,533 is directed to a bottle having internal threads mating with external threads on a stopper.

SUMMARY OF THE INVENTION

The present invention is directed to a pour spout fitment having an enlarged spout opening thereby making it less susceptible to double pouring and advantageous for dispensing new flowable product forms such as gels. The pour spout opening is large relative to the bottle opening which is equated with the fitment's circumscribing wall. Accordingly, the pour spout fitment is less susceptible to double pouring and may also be useful for pouring more viscous product forms such as gels.

In a first aspect, the present invention is directed to a fitment having a circumscribing wall which extends generally vertically, a floor extending inwardly from a bottom edge of said wall, and a pour spout ascending from an inward portion of said floor, wherein the circumscribing wall has an upper edge that defines a circumscribing wall opening having a given area, wherein the pour spout has a top that defines a pour spout opening having a given area, and wherein a ratio of the pour spout area to the circumscribing wall area is greater than about 0.20, and preferably greater than about 0.25, and more preferably greater than about 0.30, and most preferably greater than about 0.35.

In a second aspect, the present invention is directed to a fitment having a circumscribing wall, a floor extending inwardly from said wall, a pour spout ascending from an inward portion of said floor, and ribs which extend from an exterior wall of the pour spout outwardly towards the circumscribing wall, wherein the circumscribing wall has an upper edge that defines a circumscribing wall opening having a given area, wherein the pour spout has a top edge that defines a pour spout opening having a given area, and wherein a ratio of the pour spout area to the circumscribing wall area is greater than about 0.20, and preferably greater than about 0.25, and more preferably greater than about 0.30, and most preferably greater than about 0.35.

In a third aspect, the present invention is directed to a bottle comprising a bottle body having a finish extending upward from the body and a fitment received within the body, the fitment having a circumscribing wall which extends generally vertically, a floor extending inwardly from a bottom edge of said wall, and a pour spout ascending from an inward portion of said floor, wherein the circumscribing wall has an upper edge that defines a circumscribing wall opening having a given area, wherein the pour spout has a top that defines a pour spout opening having a given area, and wherein a ratio of the pour spout area to the circumscribing wall area is greater than about 0.20, and preferably greater than about 0.25, and more preferably greater than about 0.30, and most preferably greater than about 0.35.

As used herein, the term "comprising" means that a specified material or element is present, optionally together with a further material or element, and includes including, made up of, composed of, consisting and/or consisting essentially of.

For a more complete understanding of the above and other features and advantages of the invention, reference should be made to the following detailed description of preferred embodiments and to the accompanying drawings.

DETAILED DESCRIPTION OF THE INVENTION

Referring now particularly to the drawings, a pouring fitment of the invention will be described with respect to a specific embodiment.

Figure 1:
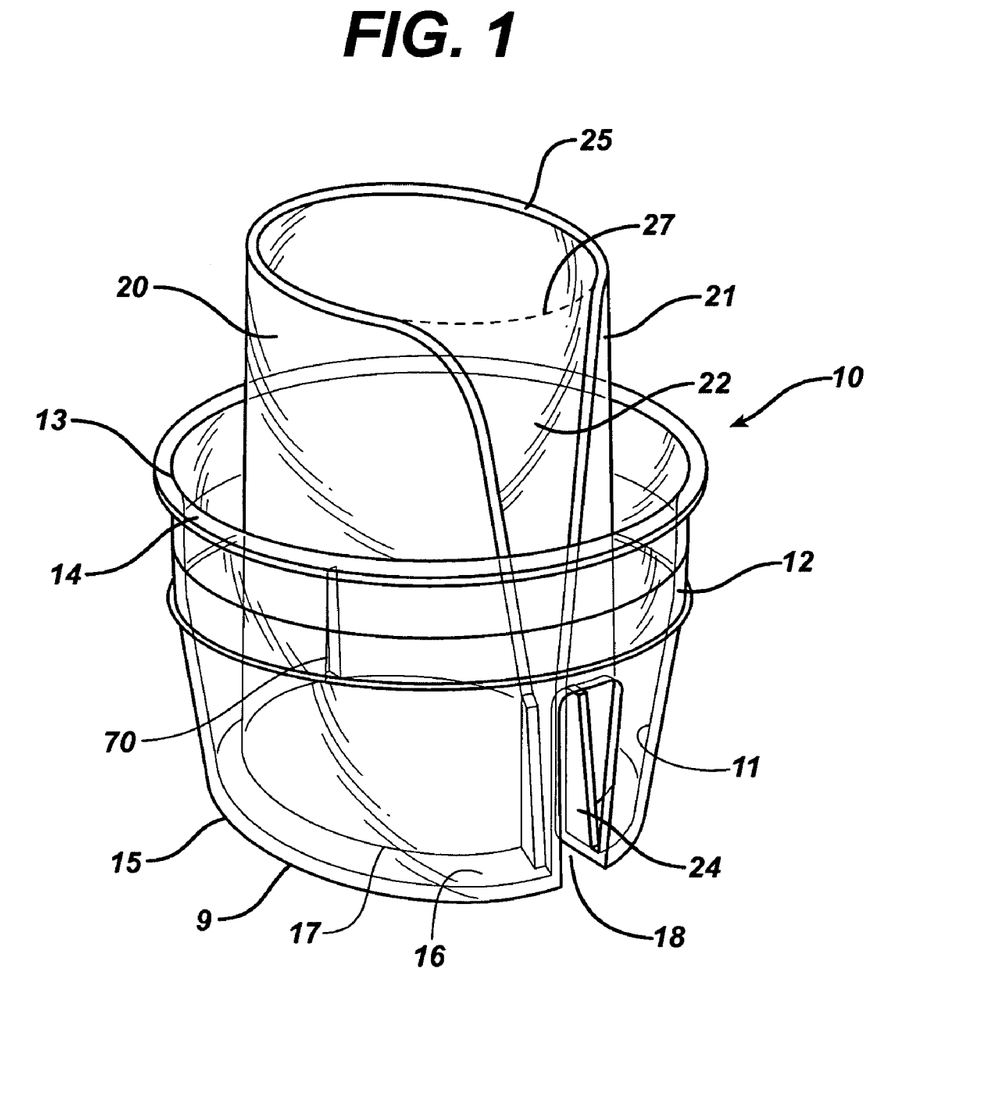
FIG. 1 is a perspective view of a fitment in accordance with the present invention.
Figure 2:
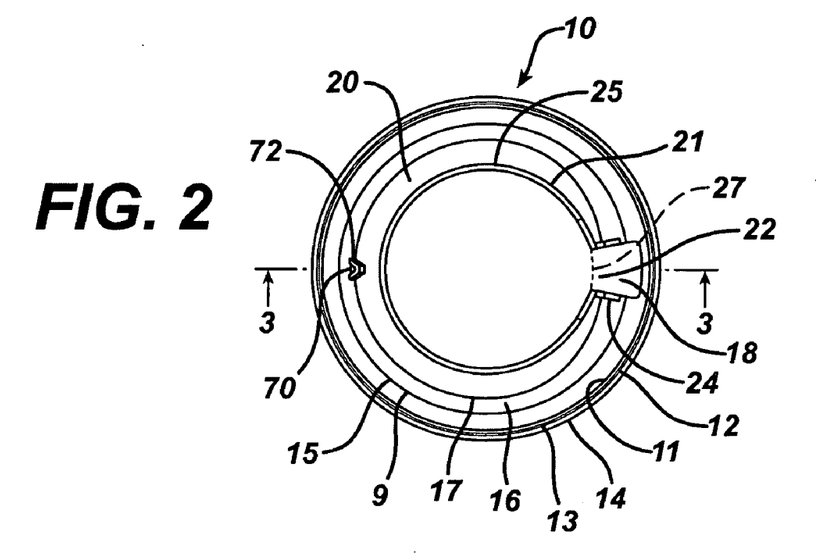
FIG. 2 is a top view of the fitment of FIG. 1 in accordance with the present invention.
Figure 3:
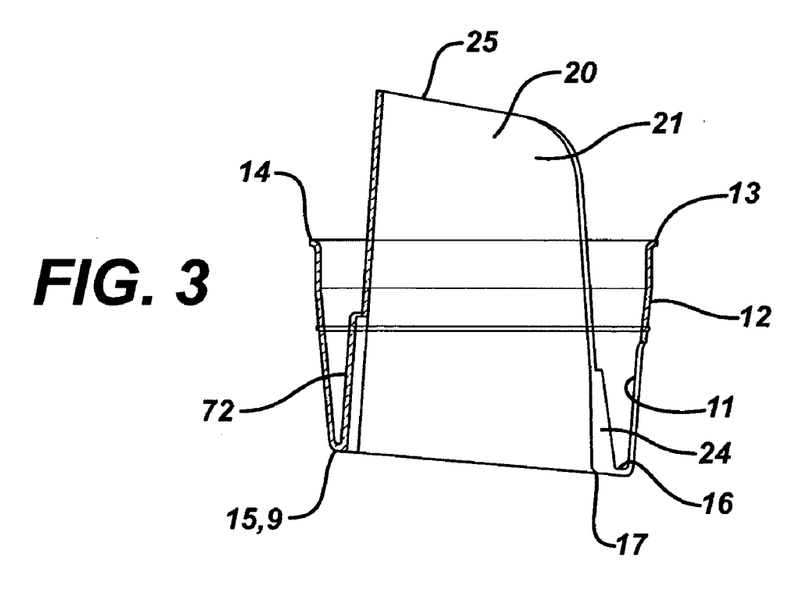
FIG. 3 is a side view of the fitment of FIG. 1 in accordance with the present invention.

The fitment 10 comprises circumscribing wall 12 which terminates at a bottom edge 15 and at an upper edge 13 on which is outwardly extending flange 14. Extending inwardly from wall 12 is floor 16 which includes a product exit aperture 18. The floor 16 may be horizontal, however it is preferably sloping. The floor may extend inward from anywhere along circumscribing wall 12, however it preferably extends inward from a bottom edge 9 of the circumscribing wall 12. Ascending upwardly from the floor 16 is pour spout 20. The back region 22 of the spout 20 (i.e. the region opposite the side where product exits when poured) may be partially open or fully open.

The circumscribing wall 12 preferably extends generally vertical meaning that it may be slightly off vertical but preferably not more than 10 degrees and more preferably not more than 5 degrees.

Figure 4:
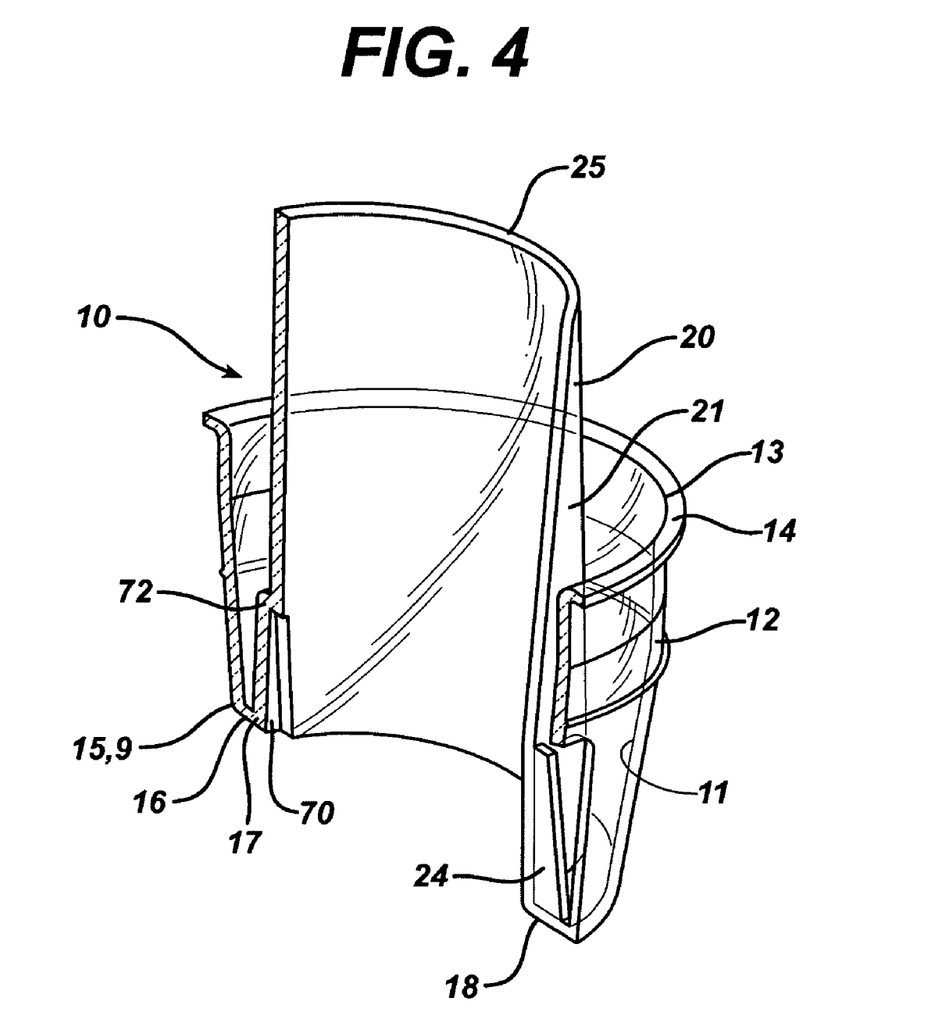
FIG. 4 is a vertical cross sectional view of a fitment with a bottle in accordance with the present invention.

The outer surface 21 of pour spout 20, the inner surface 11 of circumscribing wall 12, the downwardly sloping floor 16 and the product drainback aperture 18 combine to form a drainback reservoir and permit excess product retained by the fitment during pouring to flow back into the bottle 30. The excess product is typically product that is retained within the circumscribing wall 12 when the bottle is stood in an upright position once the user is finished pouring product. Excess product also may enter the drainback reservoir by entering through the product drainback aperture 18 when product is being poured. This usually occurs when the bottle is full such as during the first several pours of a new bottle.

Ribs 24 extend outwardly from the outer surface of the pour spout 20 along the region of the pour spout where product drainback aperture 18 meets with pour spout 20. The ribs 24 preferably extend upwardly from the floor 16 to some point along the spout. The ribs act as a dam to help prevent product from flowing from the bottle 30 out through the product drainback aperture and pouring out from over the upper edge 13 of wall 12 thus causing a double pour (i.e. causing a second pour stream, the first being the intended pour stream coming from the pour spout). Preferably, the ribs extend outwardly from the outer surface of the pour spout 20 but does not extend to the inner surface of the circumscribing wall 12. This is so any excess product that gets caught in the region between the circumscribing wall and the pour spout may have a path to drain back into the bottle through the product drainback aperture. The ribs will be effective in preventing double pours because during pouring, product that will try to flow out through the product drainback aperture will begin to build up along the rib at the point where it meets the pour spout's outer surface.

The area defined by the top edge of the pour spout is the area defined by the uppermost portion of the pour spout. In many fitments, such as the one shown in the figures herein, the pour spout is partially open on one side. In such cases, the area of the pour spout should be measured as if the spout wall that is partially open is closed by extending the spout wall in the same shape as the remaining part of the spout wall. For example, referring to FIG. 1, the wall of spout 20 is partially open in the back region 22. The area defined by the top edge 25 of pour spout 20 the area defined as if the partially opened portion 22 of the pour spout is closed to complete the cylindrical shape of the pour spout. This shape is shown by the dotted line 27 in FIG. 1. In a spout design where extending the spout wall in the same shape as the remaining part of the spout wall does not form a closed structure, then the area defined by the top edge of the spout may be defined by taking the area defined by a wall that simply extends vertically upward from the inside edge 17 of the floor 16.

Likewise, the area defined by the top edge 13 of the circumscribing wall 12 is the area at the uppermost end of the circumscribing wall. While the circumscribing wall will typically be a closed structure, in cases where it is not a closed structure the area defined by the top edge of the circumscribing wall 12 should be measured as if the circumscribing wall that is partially open is closed by extending the wall 12 in the same shape as the remaining part of the wall 12. In a fitment design where extending the circumscribing wall 12 in the same shape as the remaining part of the wall 12 does not form a closed structure, then the area defined by the top edge of the wall 12 may be defined as the area of a circle having a diameter which is equal to the distance between the two points along circumscribing wall 12 that are the farthest apart.

A closed shape or closed structure is a shape such as a circle, as opposed to an open shape such as a wedge where extending the walls in the same shape as the remaining part of the wall will lead to walls that never converge. In such a case, the defined area should be calculated as defined above.

The term "area" as used in this specification means the cross sectional area taken horizontally from the upper edge of either the spout 20 or the circumscribing wall 12.

The fitment 10 may have an alignment feature to aid in high speed assembly of the bottle and fitment. Slot 70 in spout 20 extends from the floor 16 upwards towards to the top of the spout 20. The slot 70 preferably extends less than one quarter of the height of the spout 20. The slot is useful for alignment purposes using either automated equipment that detects the slot and uses it for aligning the spout during assembly of a bottle with the fitment or simply retaining the pour spout in alignment with other object during automated assembly, such as other pour spouts. In a preferred embodiment, the spout 20 has an alignment rib 72 on its outer surface which is positioned in alignment with the slot 70. The width of slot 70 should be greater than the width of the alignment rib 72 such that the rib may be inserted into the slot when one fitment is placed on top of another. When multiple fitments are stacked during the assembly process, the alignment rib 72 will insert into the slot 70 such that the fitments will all be aligned and more easily used in a high speed assembly process.

Figure 5:
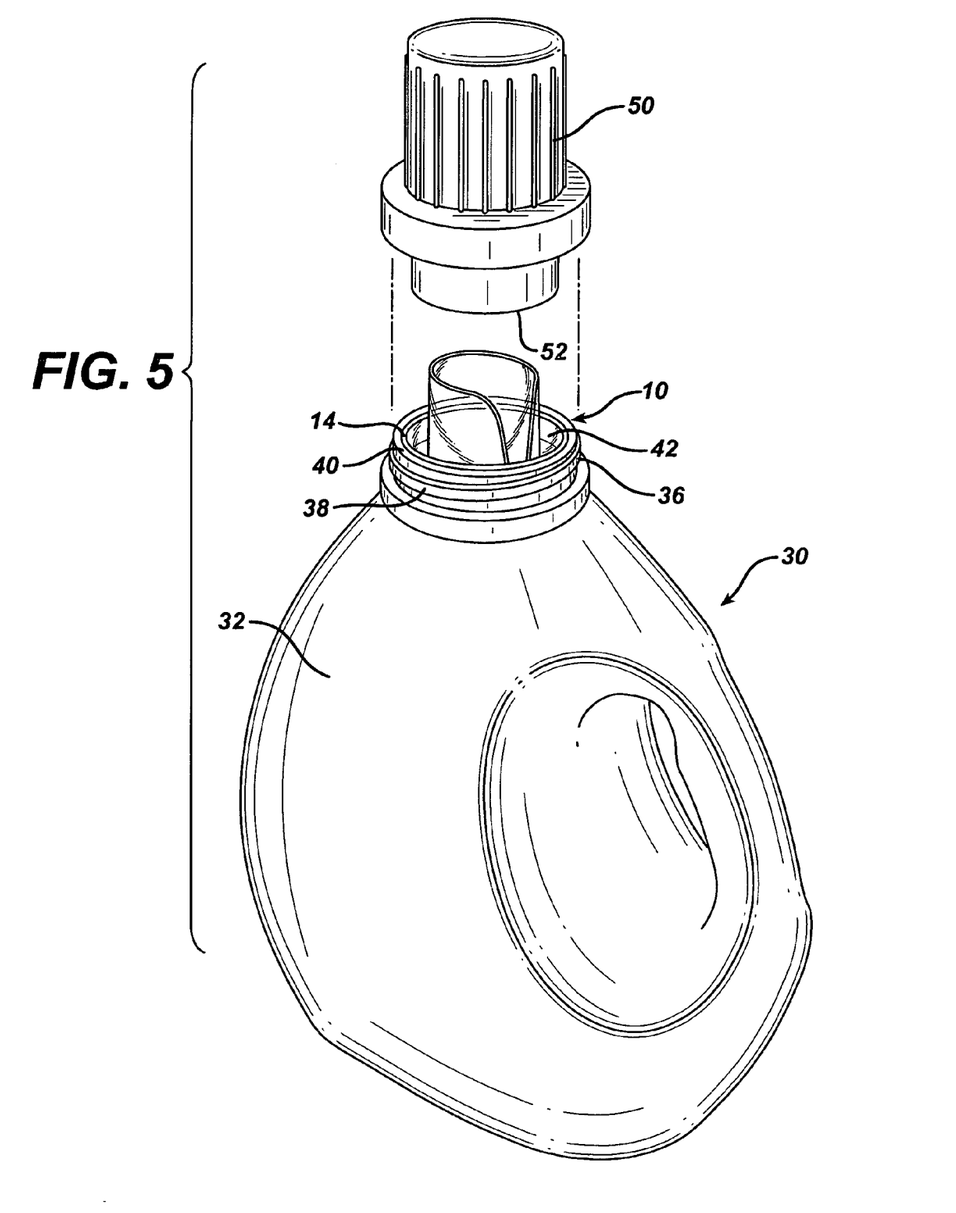
FIG. 5 is a perspective view of a container with a fitment according to the present invention.

Bottle 30 includes bottle body 32 having a finish 36 extending upward from the body. Disposed on the outer walls of finish 36 are fasteners 38 (e.g. threads), which cooperate with fasteners (e.g. threads) on closure 50 when the closure is fixed to the container. Other fasteners may be used to fix the closure to the bottle, including lugs and grooves.

Closure 50 may double as a measuring cup wherein product is poured into opening 52. Indicia such as fill lines may be engraved in the mold for determining the correct amount of product, if so desired.

Fitment 10 is preferably friction fitted into the mouth 42 of bottle 30. Moreover, fitment 10 may be fitted into mouth 42 of bottle 30 by peripheral fitment flange 14 which may rest atop bottle shoulder 40 as at 60.

The fitment may be formed from a plastic such as low or high density polyethylene, polypropylene or PET. Or the polyethylene may be the product of a 50:50 blend of a high density resin and a low density resin. The high density resin can be U.S.I. LS 506 or a similar resin. The low density resin can be U.S.I. LS 208 or the like. Instead of a mix of resins, a high density polyethylene or a low density polyethylene such as U.S.I. 241 or even a stiffer material such as polypropylene may be used to form the fitment. A clarified polypropylene or PET fitment would permit easier pouring as the liquid could be seen through the spout. Other plastic resins having chemical and physical properties similar to the aforementioned resins can be used to form the plastic suitable for use in fabricating the drainback fitment.

The pour spout and preferably all of the fitment of the invention are preferably made by injection molding and are preferably trimmed. In particular, a bottle with blown inside threads advantageously utilizes a spout of the above type. The spout may have a "horizontal" anti-drip lip naturally formed by the trimming operation. The spout may have a large anti-rotational/stacking lug.

The injection molding operation includes melting plastic resin and then extruding it into an injection mold.

The spout may be made with a continuous opening from the top to the drainback hole or, particularly if the thermo-formed spout is clear, there may only be a top opening to dispense the liquid and a separate bottom hole to drain back the liquid. This would simplify the pouring operation.

The spout and/or fitment of the invention is preferably made of polypropylene copolymer or clarified polypropylene which would be substantially clear and permit an unobstructed view. It is preferred that the fitment be sufficiently transparent so that the consumer can see the product through the fitment during pouring and measuring. Moreover, the inside of the measuring cup can be seen through the spout and this helps fill to the correct level. The spout and/or fitment of the invention may also be made of polystyrene, LDPE, MDPE, PP, HDPE, PVC, or PET.

While the circumscribing fitment wall illustrated herein is an outer wall, it will be apparent that the circumscribing wall leading to the floor need not be an outer wall. That is, the circumscribing wall circumscribes the spout, but is not necessarily the outer boundary of the fitment.

The bottle preferably is made of high density polyethylene, but also could be made of polypropylene, low density polyethylene, medium density polyethylene, polyvinyl chloride, or polyethylene terephthlate. Moreover, the bottle could be made with a monolayer wall structure, but preferably the bottle would be multilayer. For instance, a trilayer bottle could employ a natural, virgin resin, unpigmented inner layer, a pigmented virgin resin outer layer, and a middle layer combination of 25% post consumer recycled resin, in-process trim and virgin resin. Preferably, the bottle would have a handle and would be extrusion blow molded where an extruded parison would be captured and clamped within a bottle mold and injected air pressure would blow the melted plastic against the bottle mold walls, thereby forming the shape of the bottle. Preferably the bottle is fabricated from a high density polyethylene.

The closure may be formed of a harder material than that used in the fitment. Preferably, the plastic material from which the closure is made is a homopolymer polypropylene such as that sold by Phillips Petroleum Company under the designation Phillips HLV 120-01. The closure also could be made of polypropylene copolymer.

The spout and/or fitment may be made of a material that is softer, equal to or harder than the bottle resin material.

The fitment may be used for dispensing any flowable products, including home and personal care products and food products. Flowable products includes liquid products as well as other flowable product forms such as gels. The fitment is especially useful for dispensing liquid laundry detergents and fabric treatment compositions.

It should be understood, of course, that the specific forms of the invention herein illustrated and described are intended to be representative only, as certain changes may be made therein without departing from the clear teachings of the disclosure. Accordingly reference should be made to the following appended claims in determining the full scope of the invention.

What is claimed is:

1. A fitment comprising a circumscribing wall, a floor extending inwardly from said wall, a pour spout ascending from an inward portion of said floor, and one or more ribs which extend in a downward taper broadening toward said floor from an exterior wall of the pour spout towards the circumscribing wall, wherein the circumscribing wall has an upper edge that defines a circumscribing wall opening having a given area, wherein the pour spout has a top edge that defines a pour spout opening having a given area, and wherein a ratio of the pour spout area to the circumscribing wall area is greater than about 0.20.

2. The fitment according to claim 1, wherein the ratio of the pour spout area to the circumscribing wall area is greater than about 0.25.

3. The fitment according to claim 1, wherein the ratio of the pour spout area to the circumscribing wall area is greater than about 0.30.

4. The fitment according to claim 1, wherein the ratio of the pour spout area to the circumscribing wall area is greater than about 0.35.

5. The fitment according to claim 1, wherein the floor extends inwardly from a bottom of said wall.

6. The fitment according to claim 1 further comprising a flange extending radially outwardly from an upper edge of the circumscribing wall.

7. The fitment according to claim 1, wherein the floor extends inward from a bottom edge of the circumscribing wall.

8. The fitment according to claim 1, further comprising a slot in the spout which extends from the floor upwards towards to the upper edge of the spout.

9. The fitment according to claim 1, further comprising an alignment rib extending from the exterior wall of the pour spout outwardly towards the circumscribing wall functioning to align the fitment when multiple similar fitments are stacked during an assembly process.

10. A bottle comprising a bottle body having a finish extending upwardly from the body and a fitment received within the body, the fitment having a circumscribing wall which extends generally vertically, a floor extending inwardly from a bottom edge of said wall, a pour spout ascending from an inward portion of said floor, and one or more ribs which extend in a downward taper broadening toward said floor from an exterior wall of the pour spout towards the circumscribing wall, wherein the circumscribing wall has an upper edge that defines a circumscribing wall opening having a given area, wherein the pour spout has a top that defines a pour spout opening having a given area, and wherein a ratio of the pour spout area to the circumscribing wall area is greater than about 0.20.

11. The bottle according to claim 10, wherein the ratio of the pour spout area to the circumscribing wall area is greater than about 0.25.

12. The bottle according to claim 10, wherein the ratio of the pour spout area to the circumscribing wall area is greater than about 0.30.

13. The bottle according to claim 10, wherein the ratio of the pour spout area to the circumscribing wall area is greater than about 0.35.

14. The bottle according to claim 10, wherein the fitment further comprises an alignment rib extending from the exterior wall of the pour spout outwardly towards the circumscribing wall functioning to align the fitment when multiple similar fitments are stacked during an assembly process.

15. A laundry product comprising:
(A) a viscous gel; and
(B) a bottle for packaging the gel, the bottle comprising a bottle body having a finish extending upwardly from the body and a fitment received within the body, the fitment comprising a circumscribing wall which extends generally vertically, a floor extending inwardly from a bottom edge of said wall, a pour spout ascending from an inward portion of said floor, and one or more ribs which extend in a downward taper broadening toward said floor from an exterior wall of the pour spout towards the circumscribing wall, wherein the circumscribing wall has an upper edge that defines a circumscribing wall opening having a given area, wherein the pour spout has a top that defines a pour spout opening having a given area, and wherein a ratio of the pour spout area to the circumscribing wall area is greater than about 0.20.

16. The product according to claim 15, wherein the fitment further comprises an alignment rib extending from the exterior wall of the pour spout outwardly towards the circumscribing wall functioning to align the fitment when multiple similar fitments are stacked during an assembly process.

* * * * *